US010202213B2

(12) United States Patent
Jenkins

(10) Patent No.: US 10,202,213 B2
(45) Date of Patent: Feb. 12, 2019

(54) CARD SEALING FIXTURE AND METHOD OF MAKING SAME

(71) Applicant: Melanie M. Roberts, Medford, OR (US)

(72) Inventor: Henry H. Jenkins, Medford, OR (US)

( * ) Notice: Subject to any disclaimer, the term of this patent is extended or adjusted under 35 U.S.C. 154(b) by 373 days.

(21) Appl. No.: 15/219,260

(22) Filed: Jul. 25, 2016

(65) Prior Publication Data

US 2016/0332763 A1 Nov. 17, 2016

Related U.S. Application Data

(62) Division of application No. 13/585,805, filed on Aug. 14, 2012, now Pat. No. 9,399,001.

(51) Int. Cl.

*B23Q 1/00* (2006.01)
*B65B 51/10* (2006.01)
*A61J 1/03* (2006.01)
*B65B 7/28* (2006.01)
*B65D 75/36* (2006.01)

(52) U.S. Cl.

CPC ............... *B65B 51/10* (2013.01); *A61J 1/035* (2013.01); *B65B 7/2871* (2013.01); *B65B 7/2878* (2013.01); *B65D 75/36* (2013.01); *Y10T 29/49758* (2015.01)

(58) Field of Classification Search

CPC . B23Q 1/00; B23Q 1/03; B23Q 1/585; B23Q 3/00; B23P 19/00; B23P 19/04; B23P 27/00; B23P 27/062; B23P 3/103

See application file for complete search history.

(56) References Cited

U.S. PATENT DOCUMENTS

| | | | | |
|---|---|---|---|---|
| 9,399,001 | B2 * | 7/2016 | Jenkins | A61J 1/035 |
| 2014/0047798 | A1 * | 2/2014 | Jenkins | A61J 1/035<br>53/329 |
| 2016/0332763 | A1 * | 11/2016 | Jenkins | A61J 1/035 |

* cited by examiner

*Primary Examiner* — Lee D Wilson

(74) *Attorney, Agent, or Firm* — Woodling, Krost and Rust

(57) ABSTRACT

A method of making a blister sealing fixture which includes the selection of a card locating portion which has an annular wall which defines an annular recess closed by a removable bottom wall. A sealing insert portion having a cavity to receive a blister to be sealed is positioned on the bottom wall and is adapted to be moved to all positions within the recess. A sample or test card of the configuration of a production run to be handled by the sealing fixture is selected and to this card a sample or test blister is attached. The position of the blister on the card is determined by the user and has herein has at times been referred to as a desired position or location. This resulting positioning device is then placed over the recess with the test blister engaging the recess in the sealing insert.

3 Claims, 7 Drawing Sheets

CARD SEALING FIXTURE AND METHOD OF MAKING SAME

FIELD OF THE INVENTION

The present invention relates to sealing fixtures for use in the field of sealing blisters, usually of a transparent plastic material which contain a product to be sold, to a card which carries sales, instructional information and a resinous heat active coating on the face thereof.

BACKGROUND OF THE INVENTION

Conventionally in the blister sealing art fixtures are custom made to conform to the drawings and specifications supplied by the user. When the blister placement, shape or size is changed, it is required that an entirely new custom made sealing fixture be produced with its attendant high costs for materials and skilled labor which also results in long lead times.

SUMMARY OF THE INVENTION

The present invention significantly reduces these costs and shortens lead times because stock components will be available that can be used in the new assembly disclosed herein to construct a sealing fixture to accommodate any desired shape, size or placement of the blister on the card. The new structure includes what has been referred to as a card locating apparatus which comprises a generally rectangularly shaped wall, which defines a through cavity or recess which is closed at the bottom with what is described as a bottom board. A sealing insert is loosely or slidably positioned on the bottom board and a sealing insert positioning device which includes a sample blister card with a sample blister attached thereto is used to properly position the sealing insert as more fully demonstrated hereafter. The sealing insert is secured in place and thereafter the apparatus is used for production runs of blister cards with product contained in the blister. In this condition these described parts may be referred to as a blister sealing fixture. If desired the bottom board with attached sealing insert can be removed in favor of a new insert attached to a new bottom board which is designed to accommodate a blister of a different size, configuration or location.

DESCRIPTION OF THE INVENTION

Figure 1:
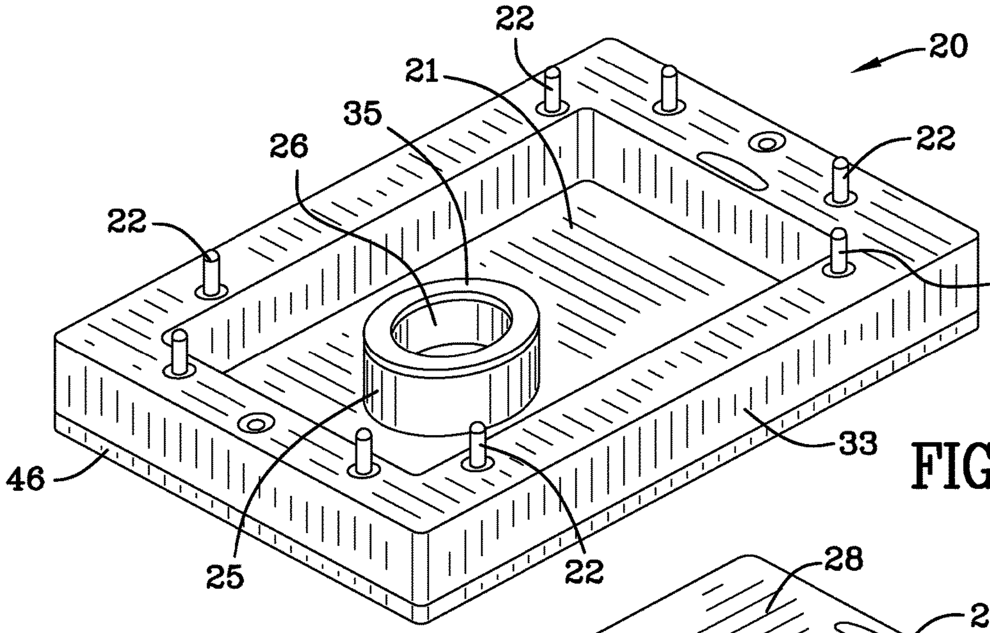
FIG. 1 is an isometric view of the basic construction of the card locating fixture of the present invention.
Figure 12:
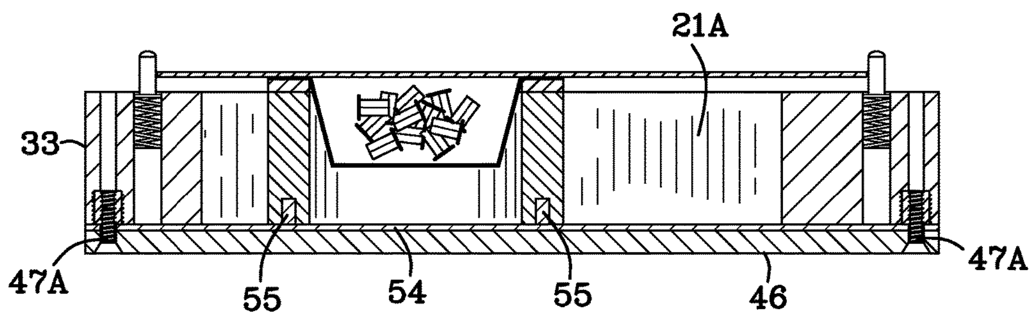
FIG. 12 is an assembled side view of the parts shown in FIG. 11.

The structure of the present invention is illustrated for example in FIG. 1 and includes a card locating fixture shown generally at 20 having a generally rectangularly shaped wall 33 which defines a generally rectangularly shaped recess 21. The recess is open at the top as seen and closed at the bottom with a bottom board or member 46. The board 46 is removably secured to the bottom edge of the wall 33 by screws 47 (See FIGS. 8 and 9). A plurality of card locating pins 22 are positioned to extend from the top of the wall and are so located and sized to properly position a blister card with respect to the recess 21. See FIGS. 9 and 12 for the position of the blister card with respect to the pins 22. Springs 23 are illustrated in FIGS. 9 and 12. These pins 22 are all biased by springs 23 to their most vertical position which assists in laterally positioning a card relative to the cavity. It will be understood that while wall 33 is shown as constructed of one piece it can be made of two or more similar pieces sandwiched together when desired as for example when the machining needs to be simplified. The wall 33 is preferably constructed of medium density fibreboard.

A sealing insert 25 is shown positioned loosely in the recess 21 with its bottom surface 36 on the bottom board 46 and as positioned as seen in FIG. 1 can be moved laterally to any position within the recess. The insert 25 shown is circular in configuration and is preferably of medium density fibreboard construction. The top surface 35 of the insert is provided with an approximately ⅛" thick surface of compressible heat resistant material which aids in applying an even pressure on the sealing area regardless of any minor inaccuracies in material thickness. It will be appreciated by those skilled in the art that the sealing insert 25 may assume many configurations including square and rectangular and may have variations in the vertical height based primarily on the configuration of the blister which is to be carried by a blister card.

Figure 2:
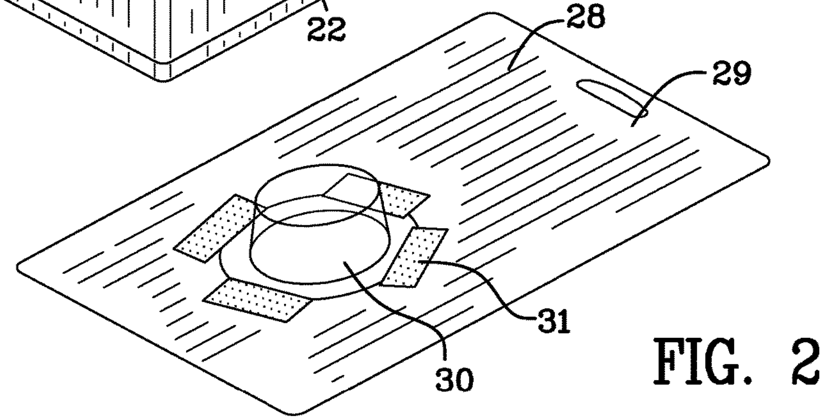
FIG. 2 is an isometric view of the positioning device which comprises a sample card to which has been attached by tape or other means a sample blister.

FIG. 2 illustrates a next step in the use of the apparatus in the method of the present invention. Here the positioning device referred to above is more fully described. It includes a sample or test card 28 which is of the correct size and shape of a desired future production run and to the face or front 29 of the card a test or sample blister 30 is attached by tape 31. The position of the blister on the card 28 is predetermined based on many factors including the placing of instructional and advertising material on the face of the card. The size and configuration of the blisters to be used are many and most are constructed of synthetic resinous materials which are compatible with the resinous heat activated adhesive coating applied to the face of production runs of blister sealed cards.

Figure 3:
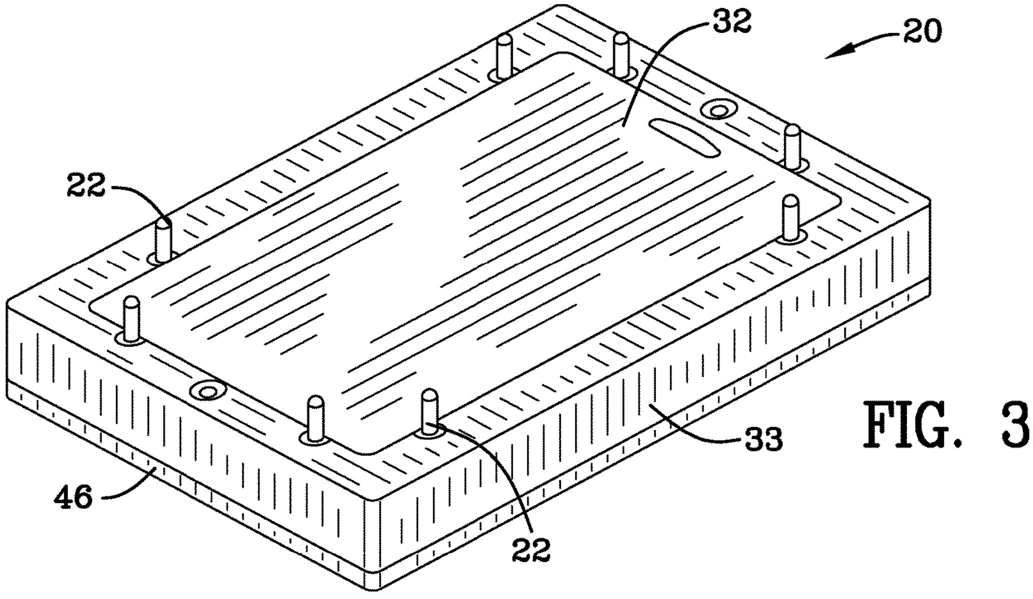
FIG. 3 is an isometric view of the card of FIG. 2 as positioned on the fixture of FIG. 1 with the back facing upwardly.

FIG. 3 illustrates the use of the positioning device in locating the sealing insert. The card is positioned within the pins with the face 28 down with respect to the recess 21 and with the blister 30 positioned generally in the cavity 26 of the sealing insert. This positioning is generally adjusted until the sealing insert is shifted to the exact desired position in the recess 21 relative to the front face of the card. See FIGS. 1 and 3.

Figure 4:
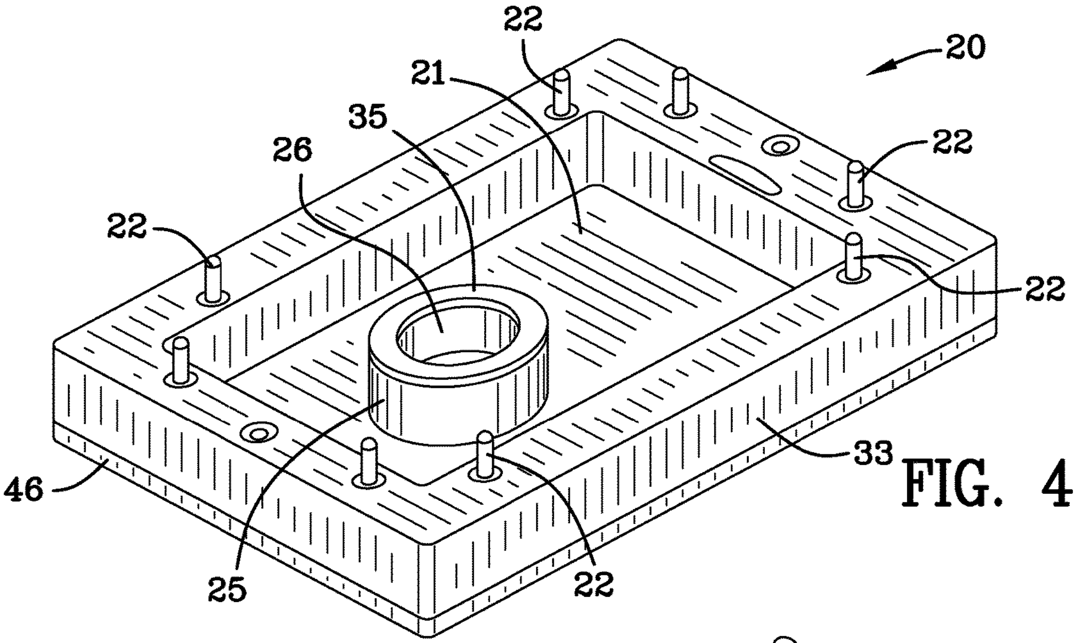
FIG. 4 is an isometric view showing the card of FIG. 3 removed from the fixture and with the sealing insert properly located in the fixture.
Figure 5:
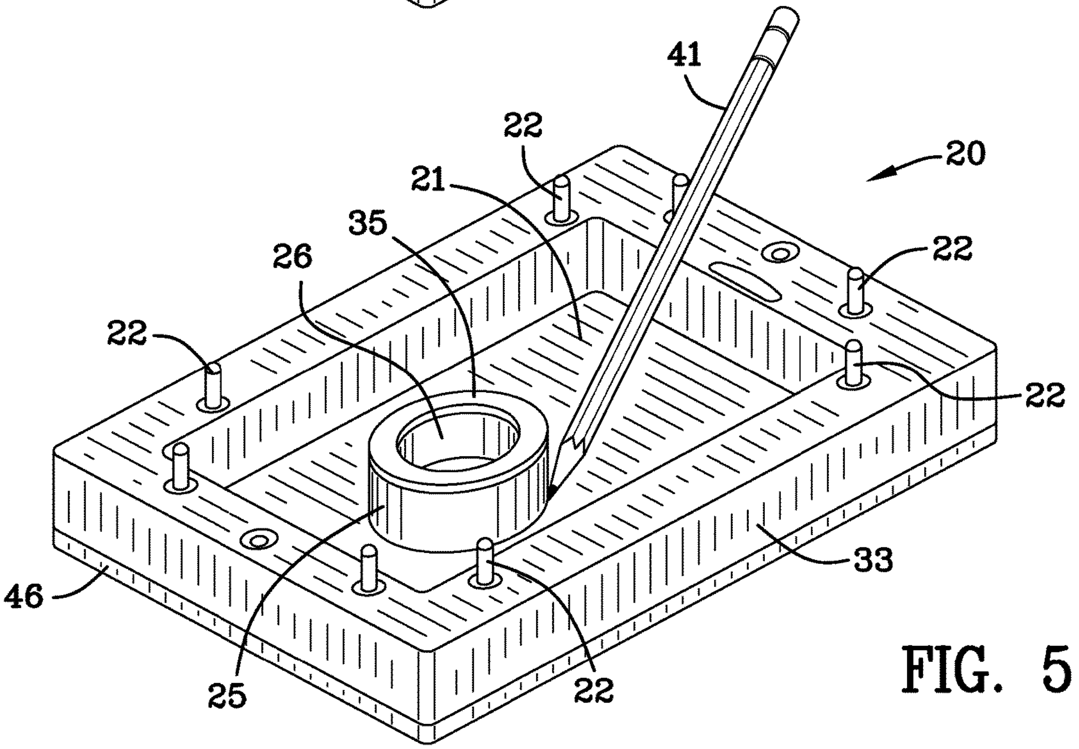
FIG. 5 illustrates the marking of the position of the sealing insert which has been positioned as shown in FIG. 4 and which will be explained in detail hereinafter.
Figure 6:
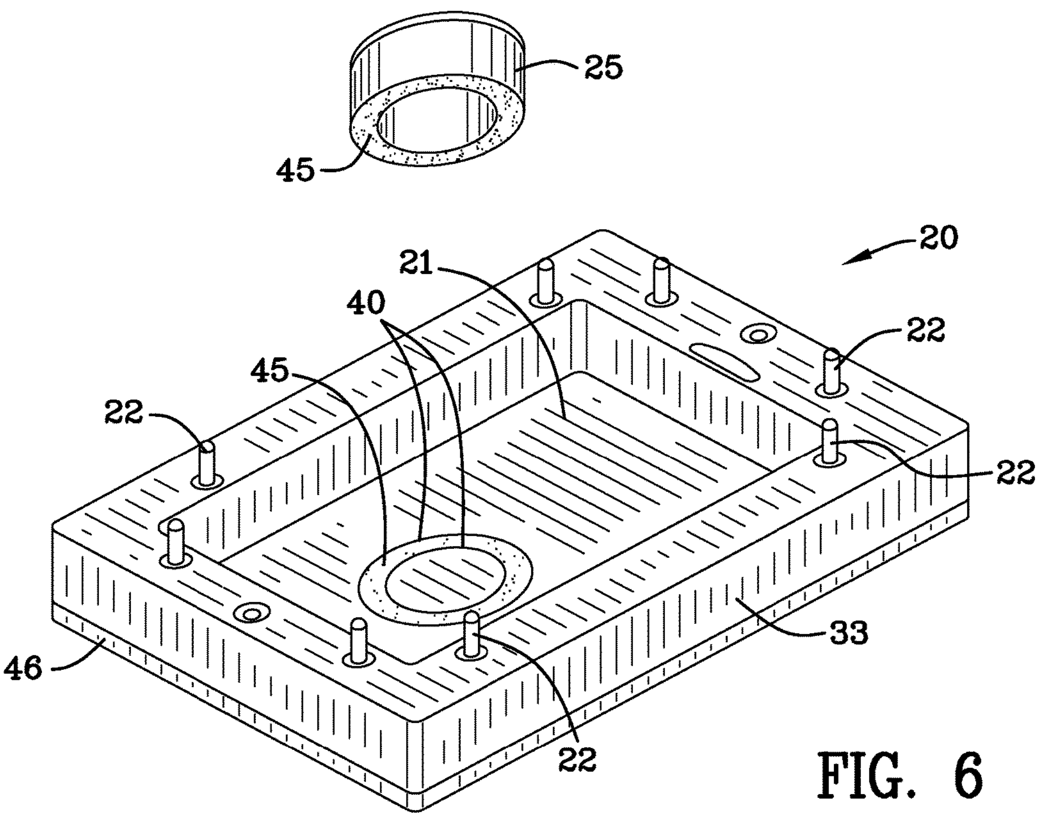
FIG. 6 is an exploded isometric view illustrating the attachment of the sealing insert.

The positioning device (28,30) is then carefully removed from the position of FIG. 3 leaving the sealing insert 25 properly positioned in the recess 21 as demonstrated in FIG. 4. FIGS. 5 and 6 demonstrate the means of fixedly attaching the sealing insert to the bottom board 46. The insert position is marked by use of the pencil 41 or other suitable instrument as shown producing the pencil lines 40 as seen in FIG. 6. Glue 45 or other suitable adhesive is then applied to the area between lines 40 on the bottom board 46 and the bottom surface of the sealing insert 25. The two are then brought together and the insert is permanently attached to the bottom board and the apparatus is then ready to be used in the production runs of producing blister packages containing commercial products.

Figure 7:
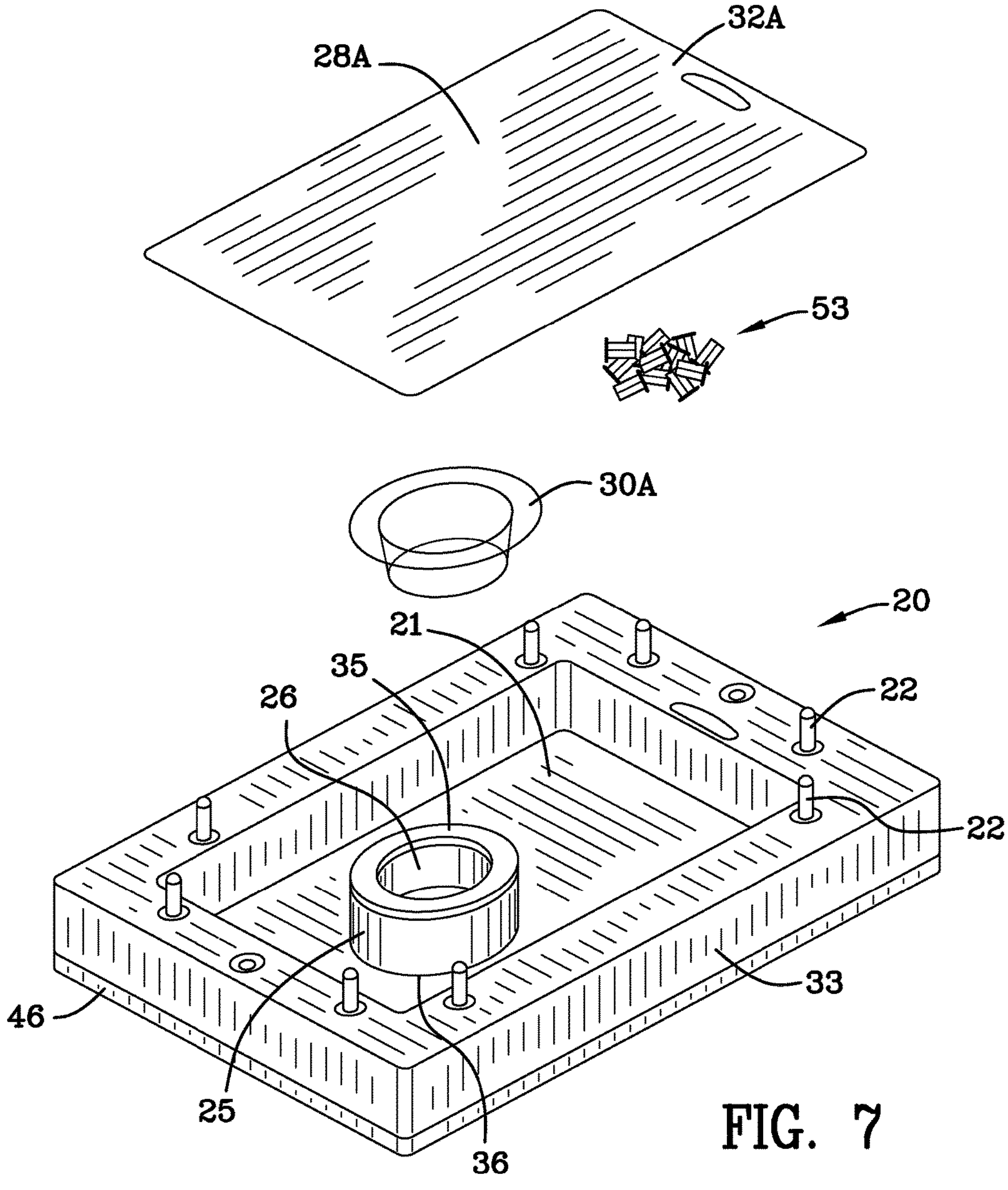
FIG. 7 is an exploded isometric view illustrating the components of the sealing fixture of the present invention.
Figure 8:
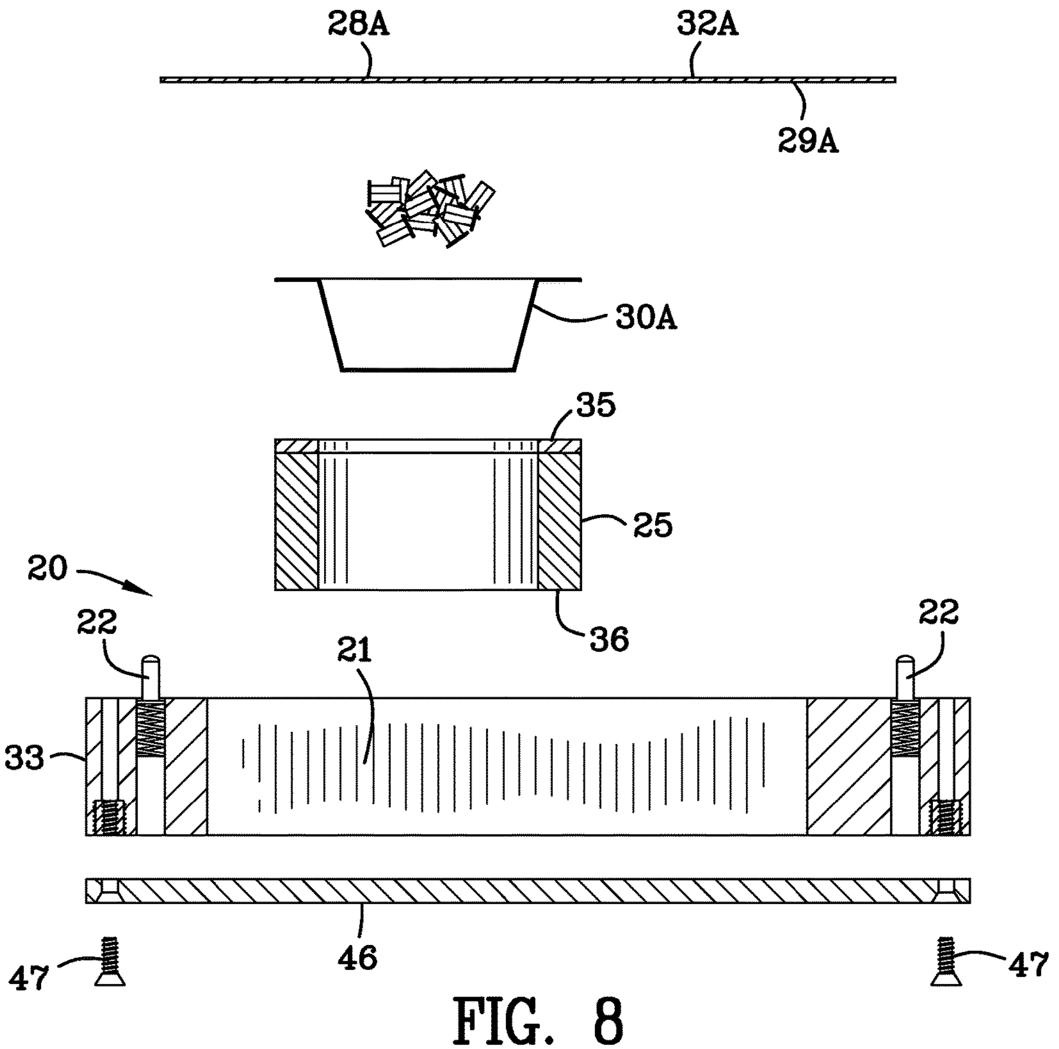
FIG. 8 is an exploded schematic illustration shown in cross section illustrating the relationship of the parts prior to a production sealing operation.
Figure 9:
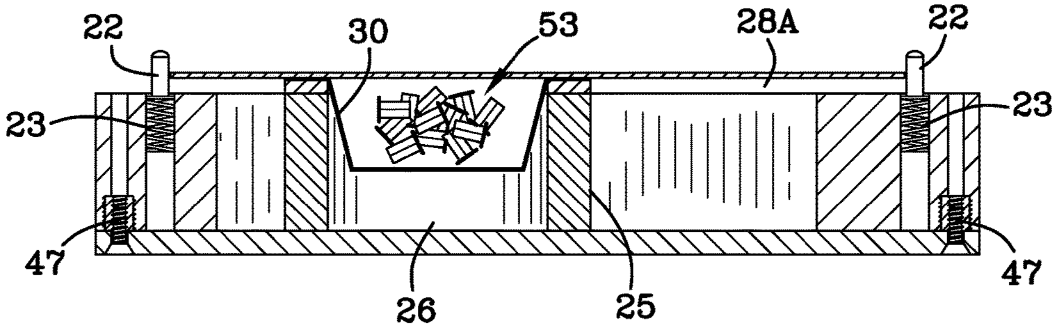
FIG. 9 is an assembled side view of the parts shown in FIG. 8.

FIGS. 7-9 illustrate the use of the apparatus of the present invention as a sealing fixture for use in the production of blister sealed products. Here there is shown the locating fixture 20 with sealing insert 25 glued fixedly in place in position to receive a blister 30A. Product 53 is placed in the blister 30A, the pins 22 on the upper wall of the fixture guide the blister card 28A into the proper position relative to the recess 21. The sealing operation and (heat-pressure) seals the blister to the face of the card.

With all of the components assembled as shown in FIG. 9 they are placed in a carriage or trundle and moved laterally into a sealing machine which applies heat and a sealing pressure designed to assure attachment of the flange of the blister with the front face of the card. The sealing machine has not been shown but will be one of those which are available to those knowledgeable and skilled in the art.

Figure 10:
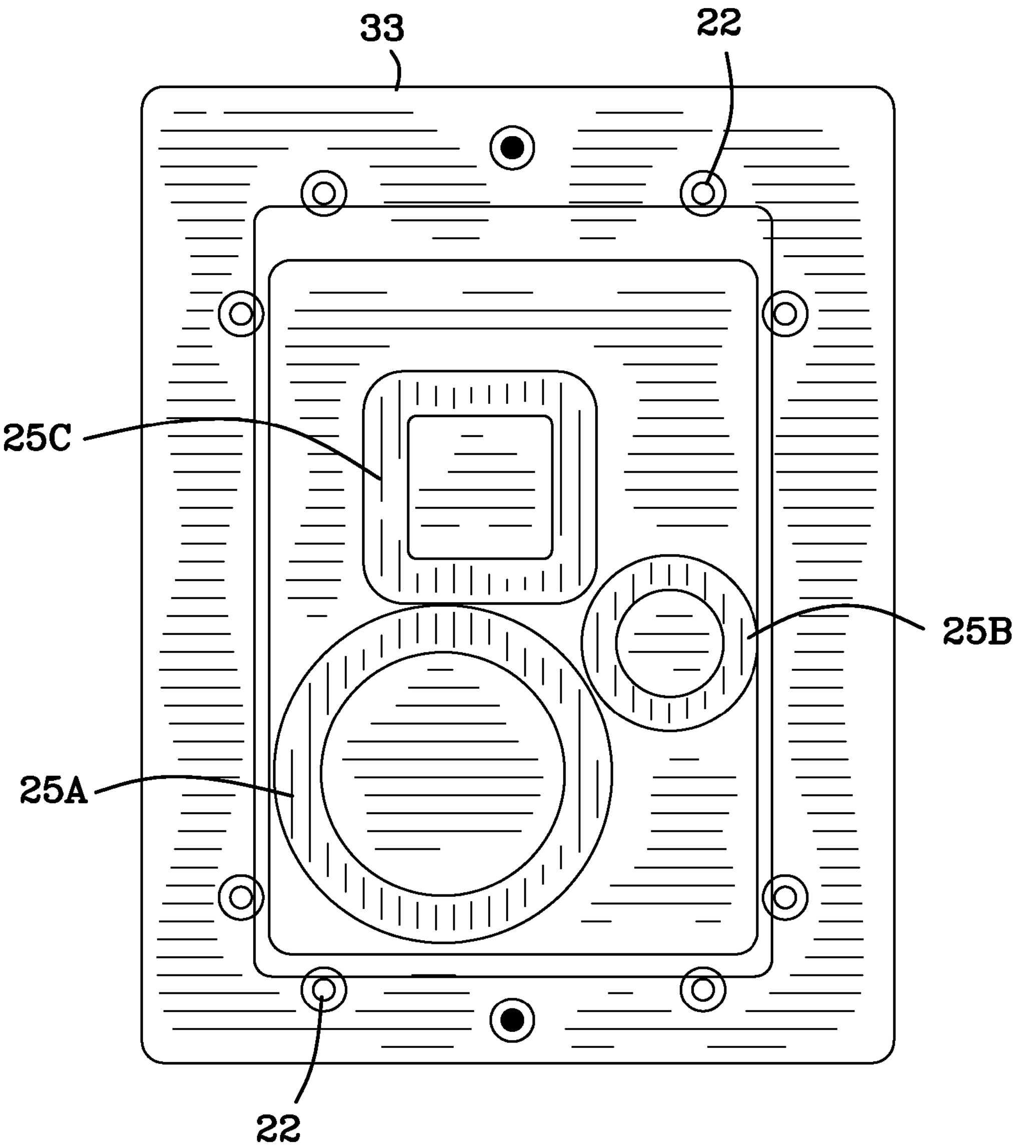
FIG. 10 is a schematic plan view simply illustrating how sealing inserts of many configurations can be located in the locating fixture recess and the various positions that they may occupy.

FIG. 10 illustrates how the invention can be used to incorporate sealing inserts of different configurations to handle blisters of different configurations. The sealing inserts here have been identified as 25A, 25B and 25C simply for identification. These can all be located in the same recess for handling multiple blisters on a card. This illustrates the flexibility of the invention in that the sealing inserts can be located any place within the recess. The recess is sized in such a way that sealing insert's dimension will not allow a blister to be located on a card in such a way that the blister flange will extend over the edge of the sealed card.

Figure 11:
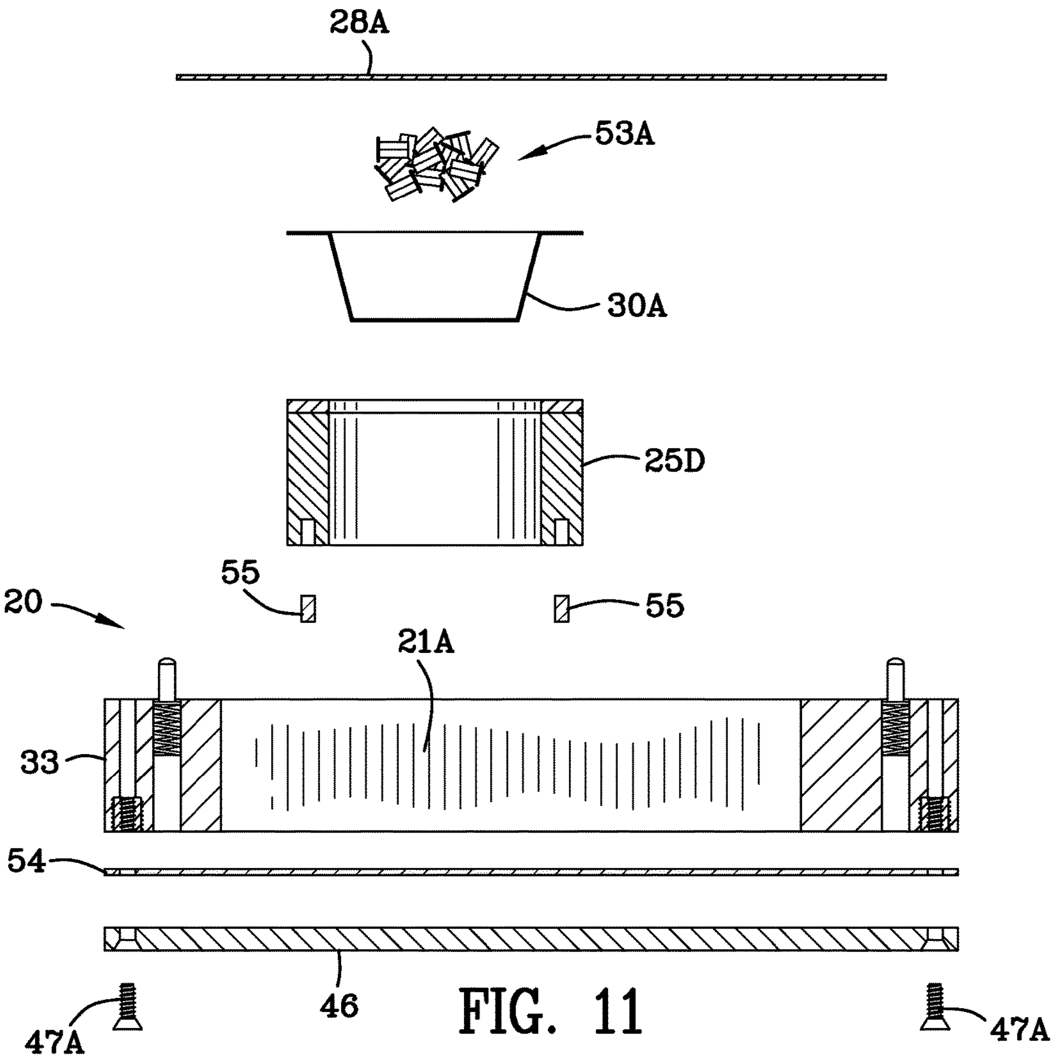
FIG. 11 is an exploded schematic illustration shown in cross section illustrating the relationship of the parts prior to a production sealing operation of a variation of the invention shown in FIGS. 1 through 9.

FIGS. 10 and 11 illustrate a variation of the structure to carry out the teachings of the present invention. In this embodiment of the invention there is placed on the bottom board 46 a ferrous base sheet 54 which is attached to the structure 20 in much the same manner as the bottom board is attached in FIGS. 8 and 9. The sealing insert 25D shown herein has magnetic inserts 55 inserted into the bottom wall 36 thereof. The attraction between the sheet 54 and the magnetic inserts 55 allows the insert 25D to be moved to a desired position yet holds the insert in the position selected while the sealing operations described herein are performed.

In the use of the structure just described the sealing insert 25A is placed in the recess 21A in the same manner as sealing insert 25 is placed in the recess 21 of FIG. 1. A positioning device as described in connection with FIGS. 1 through 3 is constructed of a sample card and sample blister and the sealing insert 25A is manipulated into position in the same manner as sealing insert 25 is manipulated into position in FIGS. 1 through 3. The magnetic attraction between base sheet 54 and magnets 55 holds the insert 25A in position and can be varied to suit different requirements. The position of the components in FIG. 12 is at a sealing operation.

The invention has been set forth by way of example. Those skilled in the art will readily recognize that changes may be made to the invention without departing from the spirit and scope of the appended claims.

REFERENCE NUMERALS

20—card locating fixture
21—recess—FIG. 1
21A—recess—FIG. 11
22—pins
23—springs
25—sealing insert—FIG. 1
25A,B,C—sealing inserts—FIG. 10
25D—sealing insert—FIG. 11
26—insert cavity
28—sample card
28A—production card
29—card front
30—sample blister
30A—production blister
31—tape
32—card back
33—wall of 20
35—top of 25—heat resistant compressible material
36—bottom of 25
40—pencil lines
41—pencil
45—glue
46—bottom board
47—screws
53—product
54—ferrous base sheet
55—magnetic inserts

The invention claimed is:

1. A method of making a blister sealing fixture comprising the steps of selecting a card locating fixture which has a generally rectangularly shaped wall defining a generally rectangularly shaped recess closed by a bottom wall and with a plurality of spaced and spring biased card locating pins positioned on said rectangularly shaped wall, selecting a blister sealing insert having first and second end surfaces and a cavity and placing the sealing insert in the recess with the first end surface in sliding engagement with said bottom wall, selecting a sample card having a perimeter adapted to fit within the spaced spring biased card locating pins and so positioning said sample card, selecting a sample blister which is adapted to hold product and attaching the same to the front surface of the sample card in a predetermined position, placing the sample card with the attached sample blister over the generally rectangularly shaped recess and with the sample blister engaging the cavity of the sealing insert and causing the sealing insert to slide along the bottom wall to the predetermined position, removing the sample card and sample blister from the fixture and leaving the blister sealing insert in the predetermined position, marking the position of the blister sealing insert on the bottom wall, applying an adhesive between the first end surface of the sealing insert and the bottom wall to fixedly secure the sealing insert in place.

2. A method of making a blister sealing fixture comprising the steps of selecting a card locating fixture which has a generally rectangularly shaped wall defining a generally rectangularly shaped recess closed by a bottom wall, selecting a blister sealing insert having first and second end surfaces and a cavity and placing the sealing insert in the recess with the first end surface in sliding engagement with said bottom wall, selecting a sample card having a perimeter adapted to rest upon said rectangularly shaped wall and over the recess, selecting a sample blister which is adapted to hold product and attaching the same to the front surface of the sample card in a predetermined position, placing the sample card with the attached sample blister over the generally rectangularly shaped recess and with the sample blister engaging the cavity of the sealing insert and causing the sealing insert to slide along the bottom wall to the predetermined position, removing the sample card and sample blister from the fixture and leaving the blister sealing insert in the predetermined position, and securing the sealing insert to the bottom wall.

3. A method of making a blister sealing fixture as claimed in claim 2 wherein said bottom wall is removably secured to the rectangularly shaped wall and may be removed with the sealing insert attached thereto and replaced with a new bottom board to which a new sealing insert may be attached.

* * * * *